United States Patent
Ericson et al.

(10) Patent No.: US 6,854,821 B2
(45) Date of Patent: Feb. 15, 2005

(54) SYSTEMS AND METHODS FOR PRINTING BY USING A POSITION-CODING PATTERN

(75) Inventors: Petter Ericson, Malmö (SE); Stefan Burström, Lund (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 09/812,905

(22) Filed: Mar. 21, 2001

(65) Prior Publication Data

US 2002/0024542 A1 Feb. 28, 2002

Related U.S. Application Data

(60) Provisional application No. 60/210,651, filed on Jun. 9, 2000.

(30) Foreign Application Priority Data

Apr. 5, 2000 (SE) ............................................. 0001245

(51) Int. Cl.⁷ ............................................... B41J 29/38
(52) U.S. Cl. .......................... 347/14; 347/107; 347/109; 400/88
(58) Field of Search ............................. 347/14, 16, 19, 347/37, 107, 109; 178/18.01; 346/143; 358/472; 400/88, 282

(56) References Cited

U.S. PATENT DOCUMENTS

| | | | | |
|---|---|---|---|---|
| 4,611,246 A | * | 9/1986 | Nihei | 358/256 |
| 4,797,544 A | * | 1/1989 | Montgomery et al. | 250/211 |
| 4,803,737 A | | 2/1989 | Sato et al. | 382/313 |
| 4,835,544 A | * | 5/1989 | Winterburn | 347/107 |
| 4,851,921 A | * | 7/1989 | Sato et al. | 358/474 |
| 4,851,925 A | | 7/1989 | Yamasaki et al. | 358/296 |
| 5,442,147 A | | 8/1995 | Burns et al. | 178/18.09 |
| 5,446,559 A | * | 8/1995 | Birk | 358/473 |
| 5,449,895 A | | 9/1995 | Hecht et al. | 235/494 |
| 5,675,129 A | | 10/1997 | Burns et al. | 178/18.01 |
| 5,816,718 A | * | 10/1998 | Poole | 400/88 |
| 5,825,995 A | * | 10/1998 | Wiklof et al. | 358/472 |
| 5,852,434 A | | 12/1998 | Sekendur | 345/179 |
| 5,927,872 A | | 7/1999 | Yamada | 400/88 |
| 5,953,497 A | * | 9/1999 | Kokubo et al. | 347/109 |
| 5,988,900 A | | 11/1999 | Bobry | 400/88 |
| 6,325,480 B1 | * | 12/2001 | Moghadam et al. | 347/19 |
| 6,568,777 B1 | * | 5/2003 | Anderson et al. | 347/9 |

FOREIGN PATENT DOCUMENTS

| | | |
|---|---|---|
| EP | 0 206 246 A2 | 12/1986 |
| GB | 2306669 | 5/1997 |
| SE | 9903051-2 | 3/2001 |
| SE | 9903541-2 | 4/2001 |
| SE | 0001239-3 | 10/2001 |

(List continued on next page.)

OTHER PUBLICATIONS

"Pseudo–Random Sequences and Arrays, " F. Jessie MacWilliams and Neil J.A. Sloane in "Proceedings of the IEEE, " vol. 64, No. 12, Dec. 1976.

*Primary Examiner*—Lamson Nguyen
*Assistant Examiner*—Blaise Mouttet
(74) *Attorney, Agent, or Firm*—Birch, Stewart, Kolasch, & Birch, LLP.

(57) ABSTRACT

Systems and methods consistent with the present invention include a printer for printing graphical information on a surface. The printer includes a print head for printing indicia on the surface and an image sensor for recording an image of the surface. The recorded image contains a position-coding pattern that identifies a position on the surface. A processor converts the recorded image into a recorded position, and the print head then prints indicia on the surface based on a comparison of the recorded position with the graphical information to be printed.

41 Claims, 6 Drawing Sheets

FOREIGN PATENT DOCUMENTS

| | | |
|---|---|---|
| WO | 99/39277 | 8/1999 |
| WO | 99/50751 | 10/1999 |
| WO | 99/50787 | 10/1999 |
| WO | WO 99 50787 | 10/1999 |
| WO | WO 00/29218 A2 | 5/2000 |
| WO | 00/72110 A2 | 11/2000 |
| WO | 00/72244 A1 | 11/2000 |
| WO | WO0073983 | 12/2000 |
| WO | 01/2948 A1 | 1/2001 |
| WO | WO0116691 | 3/2001 |
| WO | 01/22208 A1 | 3/2001 |
| WO | 01/48591 A1 | 7/2001 |
| WO | 01/61453 A2 | 8/2001 |
| WO | WO 01 61631 A1 | 8/2001 |

* cited by examiner

SYSTEMS AND METHODS FOR PRINTING BY USING A POSITION-CODING PATTERN

CROSS REFERENCE TO RELATED APPLICATIONS

This application claims priority benefits based on Swedish Patent Application No. 0001245-0, filed Apr. 5, 2000, and U.S. Provisional Application 60/210,651, filed Jun. 9, 2000, the technical disclosures of both of which are hereby incorporated herein by reference.

BACKGROUND OF THE INVENTION

1. Field of the Invention

The present invention relates to systems and methods for printing, and, more particularly to a printing device using a position-coding pattern.

2. Description of the Related Art

Portable computers are becoming increasingly popular in our society. While such computers can process information and display the results on a display screen, they must be connected to a portable printer to print the results on paper. Generally, computers are connected to a network printer via a network connection.

Currently, network printers can be generally separated into two categories: laser printers and inkjet printers. Laser printers operate by charging parts of a sheet of paper with static electricity. When toner is applied, it will adhere to the parts of the sheet charged by the static electricity. A heating process is then used to make the toner stick to the sheet. Inkjet printers, on the other hand, operate by passing an inkjet head over the surface of the paper. The inkjet head sprays ink according to a pattern stored in digital form in a memory.

In their current forms, both inkjet and laser printers tend to be relatively bulky and inconvenient to carry, making them ideal for portable use such as with a portable computer. U.S. Pat. No. 5,927,872 describes a system and method for printing an image on a paper using a handheld printer. The '872 patent discloses a printer that detects its change in position by comparing successively registered images of the surface of the paper. In particular, a user first marks the position where the image is to be printed and then moves the printer over the paper to print the image. The relative positions of various sub-images depends on the position where the user first initialized the printing. Thus, if the user lifts the printer during printing, the printer may not be able to print subsequent images at the correct position

SUMMARY OF A FEW ASPECTS OF THE INVENTION

Systems and methods consistent with the present invention can print on a surface having an arbitrary shape and do not need to detect the edges of the surface during printing. Moreover, systems and methods consistent with the invention may be able to easily resume printing upon interruption.

More specifically, systems and methods consistent with the present invention relate to printing graphical information on a surface. The system may include a nozzle for dispensing dye on the surface and an image sensor for recording an image of the surface. The nozzle may dispense dye on the surface by comparing the recorded image with the graphical information to be printed.

Alternatively, a system consistent with the present invention may print graphic information on a surface having a position-coding pattern. An arbitrary subset of the position coding pattern may define a coordinate position on the surface. The system may include a print head for printing indicia on the surface and an image sensor for recording an image of the surface. The print head may then print indicia on the surface based on a comparison of the graphic information with the coordinate position defined by position-coding pattern in the recorded image.

In a further alternative, a method consistent with the present invention for printing graphic information on a surface may include recording an image of the surface. The method may then print indicia on the surface based on a comparison of the recorded image and the graphic information.

The foregoing summarizes only a few aspects of the invention and is not intended to be reflective of the full scope of the invention as claimed. Additional features and advantages of the invention are set forth in the following description, and may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings provide a further understanding of the invention and, together with the detailed description, explain principles of the invention. In the drawings.

DETAILED DESCRIPTION OF PREFERRED EMBODIMENTS

Figure 1:
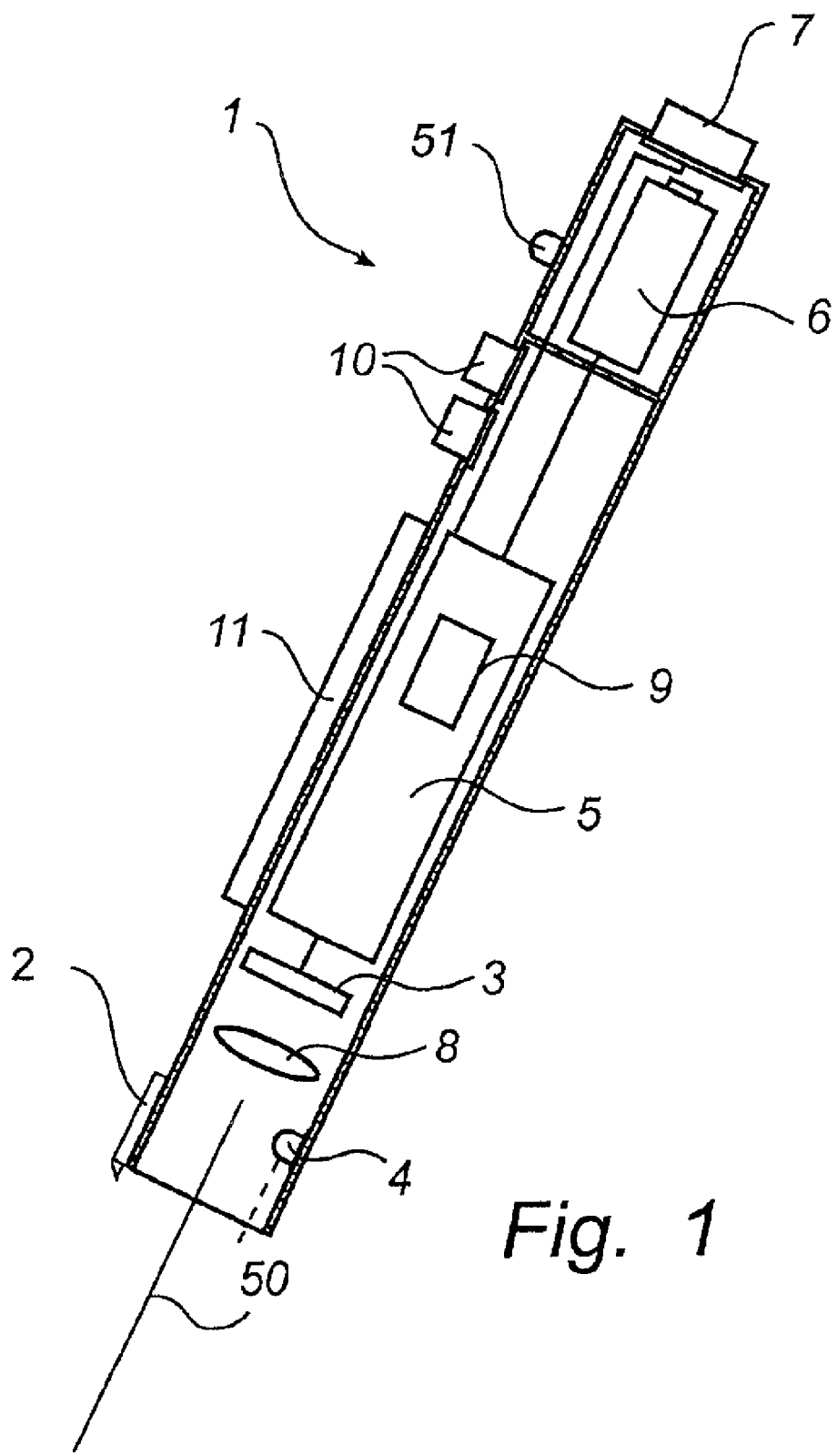
FIG. 1 illustrates a printer consistent with the present invention.

Systems and methods consistent with the present invention will now be described with reference to the accompanying drawings. FIG. 1 shows a printer 1 consistent with a preferred embodiment of the present invention. As shown in FIG. 1, the printer 1 preferably comprises an inkjet head 2, an image sensor 3 for recording an image of the surface, and a diode 4 for illuminating the surface. The inkjet head 2 may include a nozzle for dispensing ink on a surface. Further, in order for the position of images recorded by the image sensor 3 to correspond with the position of the nozzle, the inkjet head 2 may be located adjacent to the image sensor 3 at one end of the printer. In front of the image sensor 3, which may comprise a charge coupled device (CCD), there may be located a lens system 8 for imaging the coding pattern on the CCD.

The printer 1 may also comprises an image-processing means 5 for processing an image recorded by the image sensor 3, a power supply 6 (e.g., a battery) for supplying power to the printer 1, and a communication unit 7 for communicating with a computer (not shown). The image-processing means 5 may further include a microcomputer connected to a memory 9 for storing graphic information (e.g., the printed textual information or non-textual image information) received, for instance, via communication unit 7. While FIG. 1 shows the memory 9 as included within the printer 1, the printer 1 may also communicate with a remote memory (not shown) that stores the graphic information. Finally, the printer 1 may include buttons 10 for operating the printer 1 and a display 11 for displaying information. For example, display 11 may display the text that is to be printed on a sheet of paper or may provide an indication (e.g., using a display light 51) when printing is completed.

In systems consistent with the present invention, a user may hold the printer 1 and pass it over a surface having a position-coding pattern described in greater detail below. As also described below, the printer 1 may then record an image of the coding pattern and dispense dye based on positions determined from the recorded image. Accordingly, printers consistent with the present invention need not detect the outer edges of the paper, as with many conventional printers. This feature allows the printer 1 to be made extremely small. However, the printer 1 need not be a handheld device. In such a case, the inkjet head 2 and the image sensor 3 may be arranged adjacent to a stationary printer.

The printer 1 has a main viewing direction 50 which is the direction in which images are recorded by image sensor 3. Since the viewing direction 50 is not also in-line with the inkjet head 2, the angle of the printer 1 is preferably accounted for when dispensing the ink. Alternatively, the printer 1 may include a multiple of nozzles for dispensing ink in one or more directions. Further, the printer 1 preferably dispenses ink dissolved in a liquid, but other dyes known in the art may be used as well, such as a pulverulent dye. The invention is therefore not limited to any particular type of ink.

Figure 2:
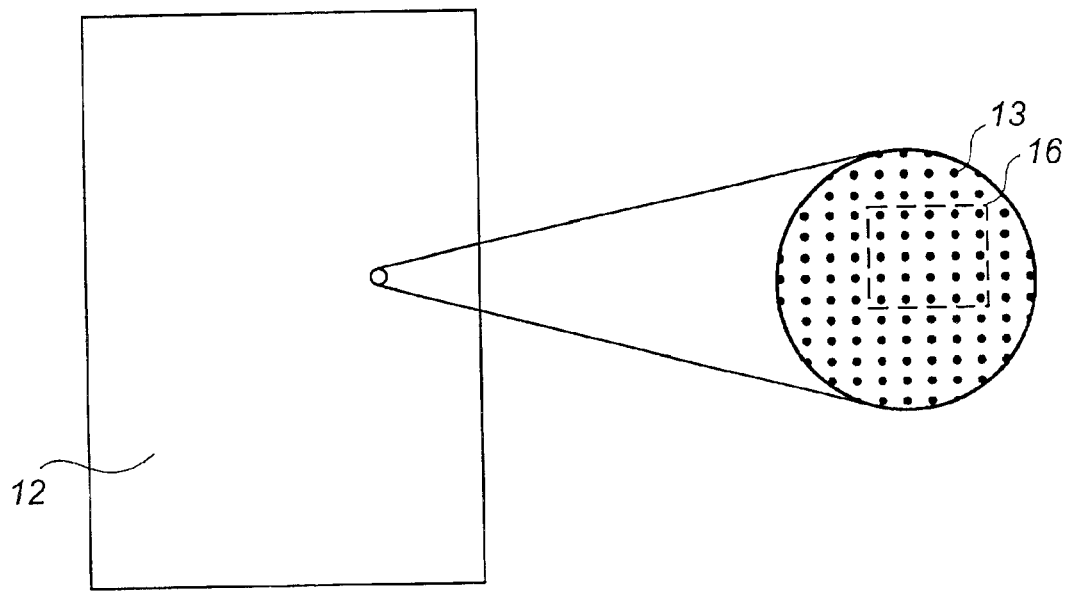
FIG. 2 illustrates a sheet of paper with a position-coding pattern consistent with the present invention.

FIG. 2 shows a sheet of paper 12 containing indicia for recording by the printer 1. As shown FIG. 2, an enlarged view of the surface of the paper 12 shows that the paper 12 includes a position-coding pattern 13. The pattern 13 preferably comprises a number of symbols arranged in a matrix. FIG. 2 also shows an area 16 corresponding to a portion of pattern 13 recorded by the printer 1. Based on information contained in the area 16 of pattern 13, the printer 1 can determine the position of area 16 within the pattern 13.

The position-coding pattern 13 may comprise a coding pattern that encodes each position within the pattern by a particular symbol, as described in U.S. Pat. No. 5,852,434, the technical disclosure of which is expressly incorporated herein by reference. Alternatively, the position-coding pattern 13 may use multiple symbols to respectively encode multiple positions, as disclosed in WO 00/73983 and WO 01/16691, corresponding to Swedish Patent Application Nos. 9901954-9 and 9903541-2, respectively, the technical disclosures of which are also expressly incorporated herein by reference. For example, WO 00/73983 discloses a position coding pattern having a large dot representing a "one" and a small dot representing a "zero". Further, the WO 00/73983 application also discloses that the coding pattern may encode four possible values by having four different displacements of a dot in relation to a raster point.

FIGS. 3a–d show exemplary symbols consistent with the present invention for coding positions in the position-coding pattern 13. As shown in FIG. 3, each symbol comprises a mark 15 and a virtual raster point 14, corresponding to the intersection between two raster lines. The value of each symbol is based on the location of mark 15 in relation to raster point 14. For example, FIG. 3 illustrates four possible locations of mark 15. In each case, the mark 15 is located on a raster line a predetermined distance away from point 14. In this way, the symbol can define four different values. In particular, the symbol of FIG. 3a has the value "0", the symbol of FIG. 3b has the value "1", the symbol of FIG. 3c has the value "2", and the symbol of FIG. 3d has the value "3". Thus, each symbol can thus represent one of four different values (e.g., "0–3").

Figure 4:
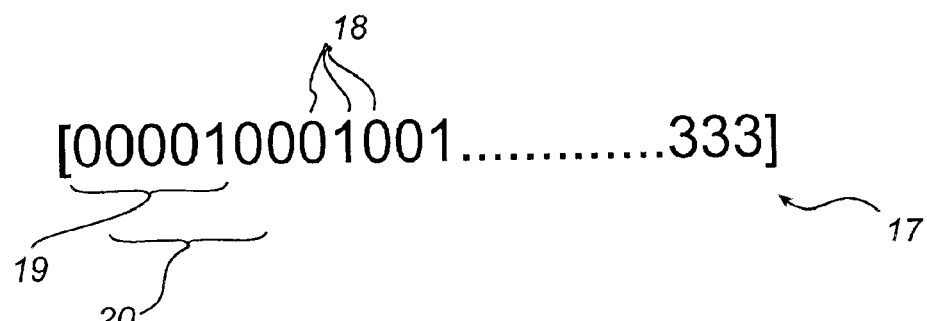
FIG. 4 shows how a position-coding pattern consistent with the present invention may be converted into a recorded position.
Figure 3:
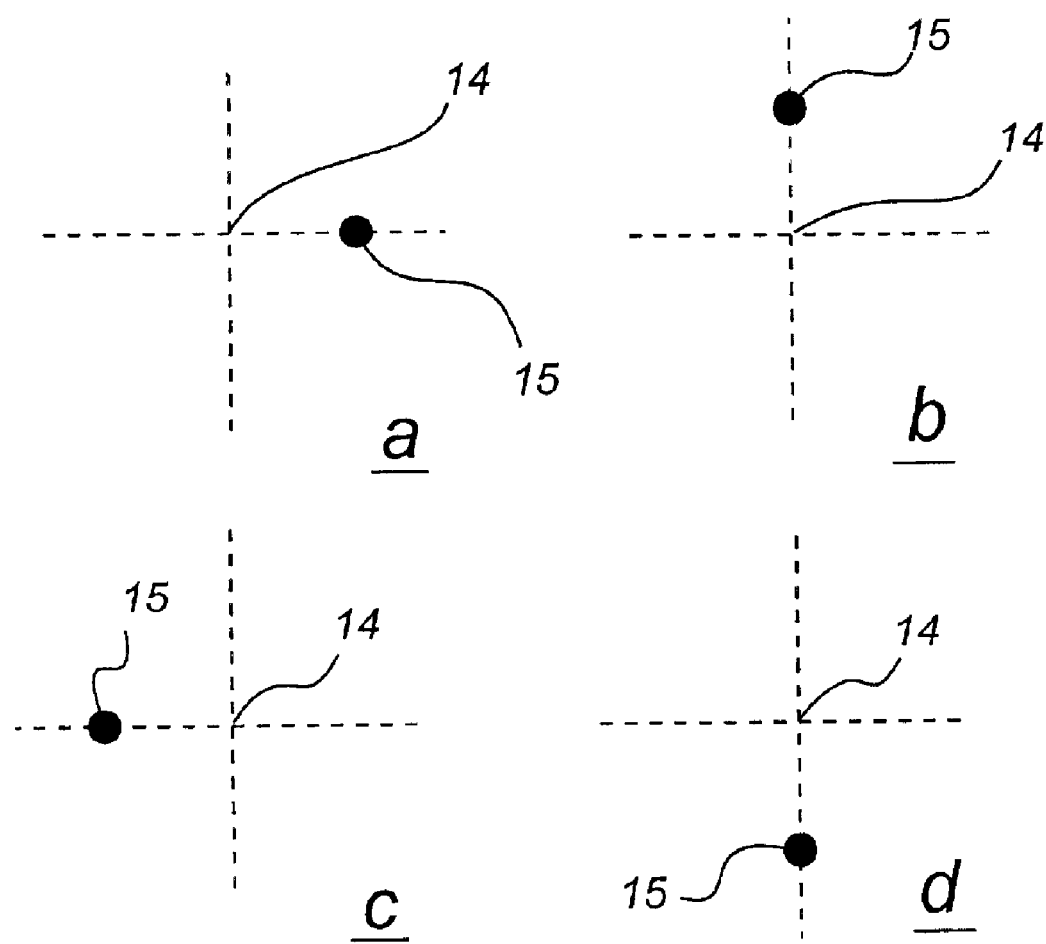
FIG. 3 shows an example of a symbol which can be used in connection with a printer according to the present invention.

FIG. 4 illustrates the appearance of a sequence 17 which may be used in the position-coding pattern 13 according to a preferred embodiment of the invention. The sequence 17 comprises a string (preferably 512 digits in length) of digit values 18, each of which, in this case, is either a "0", "1", "2" or "3". Each arbitrary subsequence (e.g., 19 or 20) of five values unambiguously defines a unique value corresponding to the position of that subsequence in the overall sequence 17. Each subsequence occurs in the sequence only once. Thus, the first subsequence 19 corresponds to the value "0" and the second subsequence 20 to the value "1". In FIG. 2, the columns and rows in the matrix of pattern 13 consist of sequences in which the values have been converted into symbols. Sequences of this kind are described in "Pseudo-Random Sequences and Arrays" by F. Jessie MacWilliams and Neil J. A. Sloane in "Proceedings of the IEEE" Vol. 64, No. 12, December 1976, the subject matter of which is expressly incorporated by reference.

Figure 5:
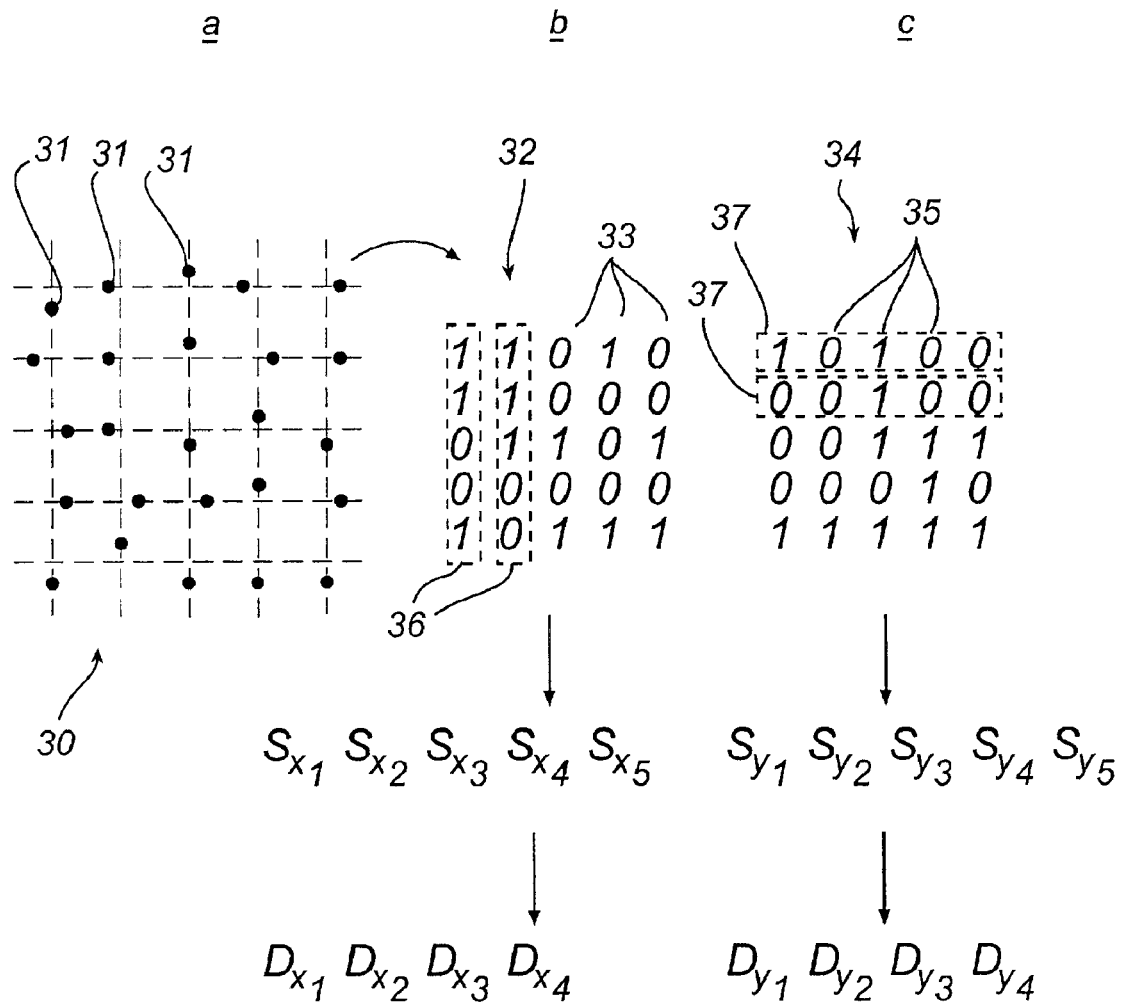
FIG. 5 illustrates how an image may be composed when using a printer consistent with the present invention.

FIG. 5 corresponds to a portion of the position-coding pattern 13 on a sheet of paper 12. A first matrix 30 in FIG. 5a is a portion of matrix that unambiguously defines a position. In FIG. 5, the position-coding pattern 13 comprises symbols 31 like those shown in FIG. 3. The position-coding pattern 13 uses the four different values to code a binary bit in each of two orthogonal directions. Thus, the four different values "0, 1, 2, 3" code the four different bit combinations (0, 0), (0, 1), (1, 0), (1, 1), where the first digit in each bit combination relates to a first direction and the second digit relates to a second direction orthogonal to the first direction.

When the printer 1 records the image of the first matrix 30 of FIG. 5, it is preferably converted into a second matrix 32 with values 33 defining the x coordinates, and into a third matrix 34 with values 35 defining the y coordinates. As described above, the first matrix 30 is converted into the second and third matrices 32 and 34 based on the predefined relationship between the values and the bit combinations. As shown in FIG. 5b, the second matrix 32 contains a column corresponding to the subsequences 36. The values in the matrix 32 are either "0" or "1". Further, the subsequences 36 are a part of the sequence 17 described above in connection with FIG. 4. Each subsequence 36 thus has a unique sequence value. The five subsequences in the columns in the second matrix 32 are then converted to five sequence values $Sx_1$, $Ss_2$, $Sx_3$, $Sx_4$ and $Sx_5$, which define the x coordinates. Similarly, as shown in FIG. 5c, subsequences 37 with values 35 are arranged in rows in the third matrix 34. These subsequences are also parts of the sequence in FIG. 4 and are similarly converted to a second set $Sy_1$–$Sy_5$ of sequence values defining the y coordinates.

Subsequently, the difference between adjacent sequence values Sx and Sy is calculated, resulting in two sets of four difference values $Dx_1$–$Dx_4$ and $Dy_1$–$Dy_4$, respectively. These difference values Dx and Dy are then used to generate an x and y coordinate. The equations below are used to calculate the difference values:

$Dx_n = Sx_{n+1} - Sx_n$ modulo R, and
$Dy_n = Sy_{n+1} - Sy_n$ modulo R,
where R is the number of unique subsequences in the sequence 17 of FIG. 4.

Systems consistent with the present invention may convert the difference values to coordinates in a number of ways. For example, the subsequences may be arranged such that one of the difference values in each matrix has an integer value in the range "0–3". This codes the most significant digit. The subsequences may also be arranged so that the x coordinate will be one unit greater when moving one column in the matrix. Similarly, the y coordinate will also be one unit greater when moving one row in the matrix. Since, in this case, the columns in the second matrix in FIG. 5b consist of parts of the sequence 17 of FIG. 4, each of the sequence values in the two columns $Sx_1$ and $Sx_2$ furthest to the left in the matrix in FIG. 5b will be one unit greater when moving down one row in the matrix 32. However, $Dx_1$ remains constant. Consequently, the x coordinate also remains constant when moving downwards in the second matrix 32.

Figure 6:
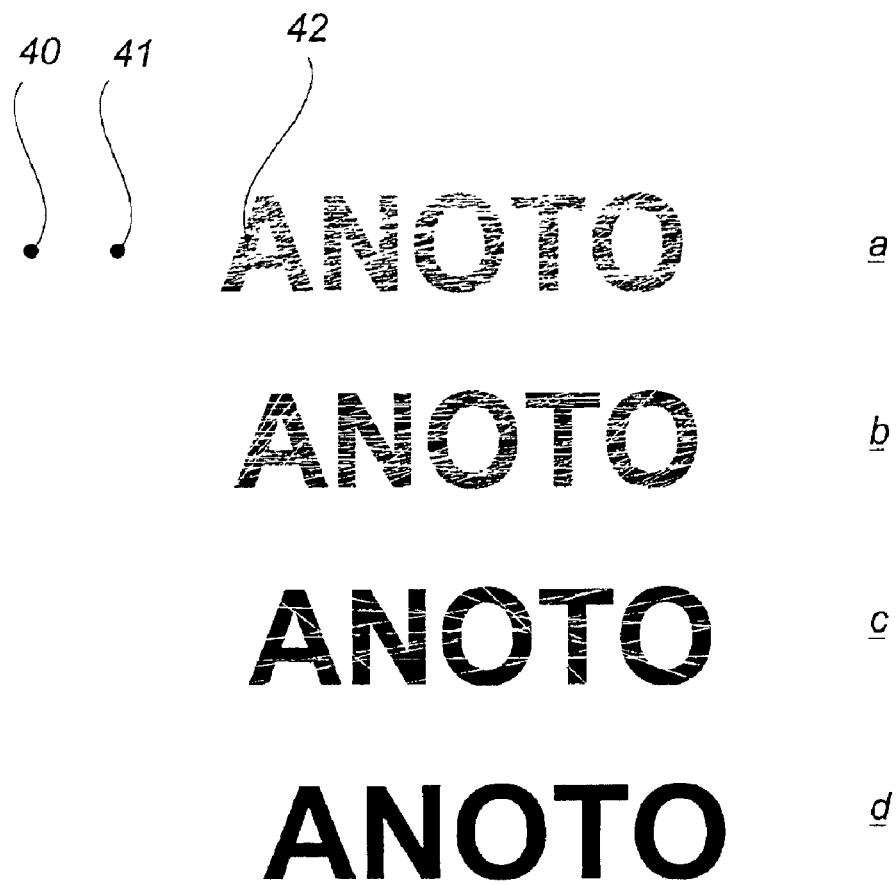
FIGS. 6 and 7 illustrate printing of graphical information on a sheet of paper consistent with the present invention.

FIG. 6 illustrates how the printer 1 may print the graphical information stored in memory 9. The printer 1 records images of the position-coding pattern on the sheet of paper and converts those images into x and y coordinate positions, as described above in connection with FIG. 5. As the printer 1 passes over the paper, images of the position-coding pattern 13 are continuously recorded and converted into positions.

In this way, the printer 1 determines the location of a first position 40 and a second position 41 shown in FIG. 6a. The image-processing means 5 may then calculate a predicted position 42 based on the first position 40, the second position 41, and the recording interval between the two positions. The predicted position 42 is then compared with the graphics positions stored in the memory 9. Since, in this case, the predicted position 42 conforms with a graphics position stored in the memory 9, inkjet head 2 dispenses ink at that position (i.e., for printing the character "A"). Similarly, ink jet head 2 will dispense ink each time the predicted position conforms with a stored graphics position. Thus, during the time interval between the time of recording the image of the second position 41 and when the inkjet head 2 is in the predicted position 42, the printer 1 may perform the following operations: convert the recorded image 41 into a position, calculate the predicted position 42, compare the predicted position 42 with the stored graphic information, and dispense the ink.

In this way, the printer 1 preferably forms the entire image as it passes over the surface of the paper. This is illustrated in FIGS. 6a–6d. In particular, dye is dispensed when the recorded position corresponds to the graphics position. By moving the inkjet head 2 and the image sensor 3 over all positions on the surface of the paper, all of the graphic information will be printed, provided that the position-coding pattern codes all graphics positions in the graphic information.

Further, when calculating the predicted position 42, the speed and direction of the printer 1 are preferably taken into account. Also, the printer 1 may print only if the speed of the printer 1 in relation to the surface is constant. If the printer 1 is either accelerating or decelerating, the printer 1 may not be able to accurately determine the predicted position. In such a case, there is an increased probability for an error to occur during the printing process.

In addition, since the inkjet head 2 is not in-line with the image sensor 3 of the printer 1, the angle of the printer 1 is preferably determined to properly dispense the ink. This is carried out by the image-processing means 5 with the aid of the recorded image. Finally, the printer 1 can determine relative movements by comparing different recorded images of the position-coding pattern. Based on this comparison and the known overall sequence 17, the printer 1 can determine how much it has moved and, thus, appropriately dispense the dye for printing the graphic information.

Because the printer 1 dispenses the dye on the surface when the recorded position conforms with a stored graphics position, the image-processing may need to be quick or the printer 1 may need to be moved slowly. If the dye is dispensed without a predicted position being calculated, the possible resolution of the printed graphics information may deteriorate. In particular, there may be a displacement between the graphics position and the position in which the dye is actually dispensed. This possible displacement depends on the image processing speed and the speed of the nozzle.

As described above, the graphic information stored in memory 9 may consist of a number of graphics positions corresponding to an image or text to be printed. Each point may correspond to a point to be printed by the inkjet head 2. While the graphics positions may be arbitrary, they may collectively define the actual graphic information.

Figure 7:
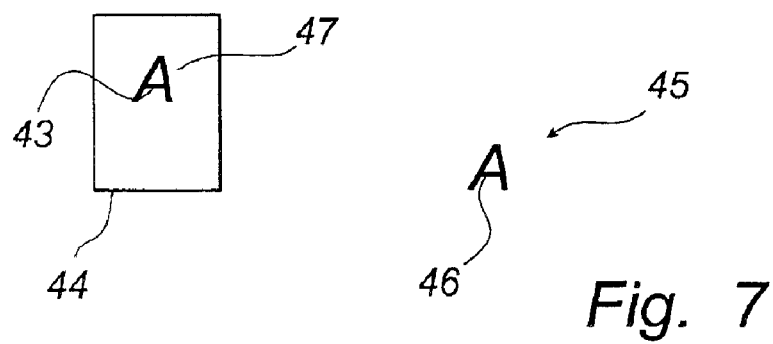

The position-coding pattern 13 may code positions within a completely different area than that in which the graphics positions are located. For this case, FIG. 7 illustrates how the printer 1 may account for how the position-coding pattern 13 codes positions other than those present in the graphic information. When a user initiates printing of the graphic information, the printer 1 may record a first image of a position-coding pattern 13 on a sheet of paper 44. The recorded image may then be converted into a start position 43 defining where a user wants the graphic information to be printed.

For example, the graphic information 45 may consist of graphics positions which define an "A". In this example, the graphics positions have no positions in common with the position-coding pattern 13 on the sheet of paper 44. The graphics positions may then be transformed so that a central graphics position 46 (e.g., the position at the center of all of the graphics positions) will be located at the start position 43. As the printer is then passed over the sheet of paper, the graphic information is printed in the form of an "A" 47.

Thus, the printer 1 may transform the graphics positions in the graphic information in response to an input signal containing information about how the graphics positions are to be transformed. The transformation is preferably performed by using at least one recorded position (e.g., position 43) as the input signal. In this way, one of the graphics positions essentially conforms with a position in the position-coding pattern. Accordingly, the printer 1 may automatically transform the graphics positions using the position-coding pattern. For instance, the graphics positions may be transformed so that the central graphics position of all of the different graphics positions will at the first recorded position.

An alternative embodiment uses the situation where the graphics positions do not coincide with the position-coding pattern. To print in this case, the sheet of paper may have a position-coding pattern that codes precisely the graphics positions present in the graphic information. The graphic information may, for example, be handwritten text recorded using another position-coding pattern than the one used to print the information. The conversion of text or images can be carried out in a number of ways which can easily be accomplished by a person of ordinary skill in the art and will therefore not be described in detail.

Printers consistent with the present invention may also print graphical information using a laser beam or by selectively heating points on the surface of the paper to thereby change the color of the paper at those points. In the later case, the printer may include a heater that selectively heats the surface similarly to how the inkjet head 2 selectively dispenses ink in the manner described above. In this embodiment, the heating may be performed using a spark gap. When a spark is generated in the spark gap, the sheet of paper is heated locally at the spark gap location. The sheet is heated in points corresponding to graphic information that is to be printed.

Figure 8:
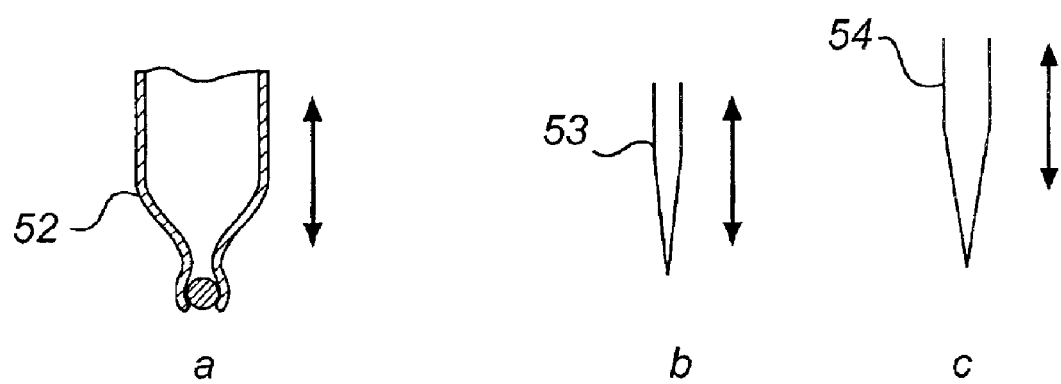
FIG. 8 illustrates various print heads that may be used as alternatives to the inkjet head shown in the printer of FIG. 1, consistent with the present invention.

FIG. 8 is an illustration showing alternative print head arrangements that may be used with the printer 1. For example, FIG. 8a shows a ball point head 52 that may be used in place of the inkjet head 2. In this case, head 52 dispenses ink on the surface when it is moved across the surface of the paper. In addition, FIG. 8b shows a point 53 for printing on a surface of pressure sensitive paper known in the art (e.g., carbon paper). In this case, point 53 selectively applies pressure to the paper at positions corresponding to graphics positions in the graphical information. Finally, FIG. 8c shows a magnetic point 54 for printing on a surface of magnetic paper. Magnetic papers are formed of small permanent magnets that give a certain color to the paper depending on their orientation in relation to the paper's surface. According to this embodiment, the point 54 is placed near the surface of the paper at positions corresponding to the graphical positions. When placed near the surface at these points, the magnetic force becomes large enough to turn the permanent magnets at these positions and thus create a printed mark.

It will be apparent to those skilled in the art that various modifications and variations can be made to the system and method of the present invention without departing from the spirit or scope of the invention. For example, other types of symbols may be used in the position-coding pattern, such as dots of different sizes to encode values. The present invention covers the modifications and variations of this invention provided they come within the scope of the appended claims and their equivalents.

Concurrently filed with the application for this patent are applications entitled Systems and Methods for Information Storage based on Swedish Application No. 0000947-2, filed Mar. 21, 2000, and U.S. Provisional Application No. 60/207,839, filed May 30, 2000; Secured Access Using a Coordinate System based on Swedish Application No. 0000942-3, filed Mar. 21, 2000, and U.S. Provisional Application No. 60/207,850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,121, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. An apparatus for printing graphical information on a surface, the apparatus comprising:
   a print head for printing indicia on the surface;
   an image sensor for recording an image of the surface, wherein the recorded image contains a position-coding pattern that identifies an absolute position on the surface; and
   a processor for converting the recorded image into a recorded absolute position by: identifying a number of symbols in the recorded image; associating said symbols with one of a plurality of code windows on said surface, wherein each code window comprises a predetermined plurality of symbols that define a unique absolute position; and determining said absolute position based on the symbols of the associated code window, wherein the print head prints indicia on the surface based on a comparison of the recorded absolute position with the graphical information to be printed.

2. The apparatus of claim 1, wherein the graphic information is at least one of the following: textual information or non-textual image information.

3. The apparatus of claim 1, further including:

a memory for storing the graphic information in the form of a plurality of graphics positions.

4. The apparatus of claim 3, wherein said processor receives graphic information and converts the received graphic information into the plurality of graphics positions.

5. The apparatus of claim 4, wherein the processor transforms the graphics positions in the graphic information in response to an input signal containing transformation information.

6. The apparatus of claim 5, wherein the input signal is a start position recorded by the image sensor and coded in the position-coding pattern, such that one of the graphics positions corresponds to the recorded start position.

7. The apparatus of claim 1, wherein the graphic information corresponds to a plurality of graphics positions, and wherein the print head prints indicia on the surface when the recorded position corresponds to a graphics position in the graphic information.

8. The apparatus of claim 1, wherein the processor determines a predicted position of the print head from the recorded position, and wherein the print head prints indicia when the predicted position corresponds to a graphics position in the graphic information.

9. The apparatus of claim 8, wherein the processor determines a speed and a direction of the print head in relation to the surface based on at least two recorded positions determined from at least two recorded images, and wherein the processor calculates the predicted position based on the recorded positions and the speed and direction of the print head.

10. The apparatus of claim 1, wherein the processor determines a speed and a direction of the print head in relation to the surface based on at least two recorded positions converted from at least two recorded images.

11. The apparatus of claim 10, wherein the processor determines whether the speed of the print head in relation to the surface is constant, and wherein the processor terminates printing by the print head when the speed is changing in an amount greater than a predetermined acceleration threshold value.

12. The apparatus of claim 1, wherein the processor:

identifies a predetermined number of symbols in the position-coding pattern in the recorded image;

determines a first position code for a first coordinate and a second position code for a second coordinate by translating each symbol of the position coding pattern into a first digit for the first position code and into a second digit for the second position code; and determines a first coordinate based on the first position code and determines a second coordinate based on the second position code.

13. The apparatus of claim 1, wherein the printer is a handheld device.

14. The apparatus of claim 1, wherein the image sensor has a main viewing direction for recording images on the surface, wherein the processor determines an angle of the viewing direction with respect to the surface based on the recorded image, and wherein the print head prints indicia according to the determined angle.

15. The apparatus of claim 1, wherein the print head and the image sensor are located in proximity to one another such that the print head prints indicia on the surface at substantially the same point on the surface where the image sensor records the image.

16. The apparatus of claim 1, wherein the print head comprises a nozzle that prints indicia by dispensing ink on the surface.

17. The apparatus of claim 16, wherein the nozzle dispenses dye in a plurality of directions.

18. The apparatus of claim 1, wherein the print head comprises a heater that prints the indicia by heating the surface.

19. The apparatus of claim 1, wherein each code window partly overlaps an adjacent code window such that these have at least one symbol in common.

20. The apparatus of claim 1, wherein said recorded absolute position is defined by two coordinate values.

21. A system for printing graphic information on a surface having a position-coding pattern thereon, wherein an arbitrary subset of the position coding pattern defines an absolute coordinate position on the surface, the system comprising:

a print head for printing indicia on the surface; and an image sensor for recording an image of the surface, wherein the print head prints indicia on the surface based on a comparison of the graphic information with the absolute coordinate position defined by a position-coding pattern in the recorded image, wherein said system converts the recorded image into the absolute coordinate position by: identifying a number of symbols in the recorded image; associating said symbols with one of a plurality of code windows on said surface, wherein each code window comprises a predetermined plurality of symbols that define a unique absolute position; and determining said absolute position based on the symbols of the associated code window.

22. The system of claim 21, further including a processor for determining a speed of the print head in relation to the surface, and wherein the processor terminates printing by the print head when the speed is changing in an amount greater than a predetermined acceleration threshold value.

23. The system of claim 21, wherein the absolute coordinate position is defined by two coordinate values.

24. A method for printing graphic information on a surface, comprising:

accessing graphical information to be printed on the surface;

recording an image of the surface;

deriving an absolute position from the recorded image by: identifying a number of symbols in the recorded image; associating said symbols with one of a plurality of code windows on said surface, wherein each code window comprises a predetermined plurality of symbols that define a unique absolute position; and deriving said absolute position based on the symbols of the associated code window; and printing indicia on the surface based on a comparison of a recorded position derived from the recorded image and the graphic information.

25. The method of claim 24, wherein each code window partly overlaps an adjacent code window such that these have at least one symbol in common.

26. The method of claim 24, wherein the recorded position is defined by two coordinate values.

27. An apparatus for printing graphical information on a surface, the apparatus comprising:
a nozzle for dispensing dye on the surface;
an image sensor for recording an image of the surface, wherein the recorded image contains a position-coding pattern that codes an absolute position on the surface; and
a processor for converting the recorded image into a recorded absolute position, wherein the processor determines a predicted position of the nozzle based on the recorded absolute position, wherein the nozzle dispenses dye on the surface when the predicted position corresponds to a graphics position in the graphical information.

28. The apparatus of claim 27, wherein the recorded absolute position is defined by two coordinate values.

29. An apparatus for printing graphical information on a surface, the apparatus comprising:
a print head for printing indicia on the surface;
an image sensor for recording an image of the surface, wherein the recorded image contains a position-coding pattern that codes an absolute position on the surface; and
a processor for converting the recorded image into a recorded absolute position, wherein the processor determines a predicted position of the print head based on the recorded absolute position, wherein the print head prints the indicia on the surface when the predicted position corresponds to a graphics position in the graphical information.

30. The apparatus of claim 29, wherein the recorded absolute position is defined by two coordinate values.

31. A system for printing graphical information, comprising:
a printing surface having a position-coding pattern thereon, wherein an arbitrary subset, having a predetermined size, of the position-coding pattern identifies a unique absolute position on the printing surface, wherein each absolute position on the printing surface is coded by a group of symbols included in said position-coding pattern, such that a number of symbols may be associated with one of a plurality of code windows on said surface, with each code window comprising a predetermined plurality of symbols that define a unique absolute position; and
a printing unit for printing the graphic information on the printing surface, wherein the printing unit further includes:
a print head for printing indicia on the printing surface; and
an image sensor for recording an image of the arbitrary subset on the printing surface,
wherein the print head prints indicia on the surface based on a comparison of the identified unique absolute position on the printing surface with the graphical information to be printed.

32. The system of claim 31, further including a processor for determining a speed of the print head in relation to the surface, and wherein the processor terminates printing by the print head when the speed is changing in an amount greater than a predetermined acceleration threshold value.

33. The system of claim 31, wherein each of said symbols is included in several groups of symbols to thereby code several different absolute positions.

34. The system of claim 31, wherein said position-coding pattern has a smallest information-carrying entity, which contributes to the coding of more than one absolute position.

35. The system of claim 34, wherein said smallest information-carrying entity consists of at least one symbol.

36. The system of claim 31, wherein the unique absolute position is defined by two coordinate values.

37. A hand-held printing device configured to print as: the device is moved over a surface upon which is recorded a position-coding pattern, the hand-held printing device comprising:
a housing configured to be held by a user;
a print head in the housing;
a sensor in the housing for reading the position-coding pattern;
a processor for determining, as the housing is moved over the surface, an absolute location on the surface based on the position-coding pattern read by the sensor, and for causing the print head to print based upon the determined absolute location, wherein said processor identifies a number of symbols in the position-coding pattern read by the sensor; associates said symbols with one of a plurality of code windows on said surface, wherein each code window comprises a predetermined plurality of symbols that define a unique absolute position; and determines said absolute location based on the symbols of the associated code window.

38. The hand-held printing device of claim 37, wherein each code window partly overlaps an adjacent code window such that these have at least one symbol in common.

39. The printing device of claim 37, wherein the determined absolute location is defined by two coordinate values.

40. An apparatus for printing graphical information on a surface, the apparatus comprising:
a print head for printing indicia on the surface;
an image sensor for recording an image of the surface, which contains a partial surface of a predetermined size of a position-coding pattern on the surface; said position-coding pattern being based on a cyclic number series, which has the characteristic that the position in the number series of each number sequence of a predetermined length is determined unambiguously and which is arranged a plurality of times on the surface with different rotations so that adjacent cyclic number series are displaced relative to each other by predetermined displacements; and
a processor for converting the recorded image into a recorded absolute position by identifying a plurality of said number sequences from the position-coding pattern on the partial surface; determining a position for each number sequence in said cyclic number series; on the basis of these positions, determining the displacements between the adjacent cyclic number series containing the number sequences from the partial surface; and determining, based on the displacements, said recorded absolute position;
wherein the print head prints indicia on the surface based on a comparison of the recorded position with the graphical information to be printed.

41. A method for printing graphic information on a surface, comprising:
accessing graphical information to be printed on the surface;

recording an image of the surface, which contains a partial surface of a predetermined size of a position-coding pattern on the surface; said position-coding pattern being based on a cyclic number series, which has the characteristic that the position in the number series of each number sequence of a predetermined length is determined unambiguously and which is arranged a plurality of times on the surface with different rotations so that adjacent cyclic number series are displaced relative to each other by predetermined displacements;

identifying a plurality of said number sequences from the position-coding pattern on the partial surface;

determining a position for each number sequence in said cyclic number series;

on the basis of these positions, determining the displacements between the adjacent cyclic number series containing the number sequences from the partial surface;

deriving, based on the displacements, an absolute position for said partial surface; and printing indicia on the surface based on a comparison of the derived absolute position and the graphic information.

* * * * *